United States Patent [19]
Gasser

[11] 3,725,775
[45] Apr. 3, 1973

[54] SELF-OSCILLATING HELIUM MAGNETOMETER

[76] Inventor: Richard E. Gasser, 430 Elm Street, Warminster, Pa. 18974

[22] Filed: Aug. 23, 1968

[21] Appl. No.: 754,769

[52] U.S. Cl. .............................................. 324/0.5 R
[51] Int. Cl. .............................................. G01r 33/00
[58] Field of Search ............. 324/0.5 R, 0.5 E, 0.5 F

[56] References Cited

UNITED STATES PATENTS

| 3,122,702 | 2/1964 | Franken | 324/0.5 |
| 3,173,082 | 3/1965 | Bell et al. | 324/0.5 |
| 3,350,632 | 10/1967 | Robinson | 324/0.5 |

OTHER PUBLICATIONS

Bloom, Optical Pumping, reprinted from "Scientific American" Oct. 1960.

Primary Examiner—Benjamin A. Borchelt
Assistant Examiner—R. Kinberg
Attorney—Edgar J. Brower and Henry Hansen

[57] ABSTRACT

A self-oscillating magnetometer having a metastable helium atom absorption cell optically pumped with the light emission line of 3888.65 Angstroms wavelength. The amount of light transmitted through the absorption cell at this wavelength is sensed by a photo-detector which has relatively high spectral response at the same wavelength. The photo-detector output signal provides a signal to a pair of Helmholtz coils for generating an RF resonance frequency field in the absorption cell and a signal to a display indicative of the ambient magnetic field strength.

7 Claims, 4 Drawing Figures

INVENTOR.
RICHARD E. GASSER

BY

*Henry Hauser*

ATTORNEY

SELF-OSCILLATING HELIUM MAGNETOMETER

The invention described herein may be manufactured and used by or for the Government of the United States of America for governmental purposes without the payment of any royalties thereon or therefor.

BACKGROUND OF THE INVENTION

The present invention relates to optical pumping magnetometers, and more particularly to self-oscillating metastable helium magnetometers for measuring weak magnetic fields.

Metastable helium magnetometers of the prior art, such as illustrated in U. S. Pat. No. 3,122,702 issued Feb. 25, 1964 to Peter A. Franken, generally operate with resonance radiation of approximately 10,830 Angstroms wavelength which is the wavelength required to optically pump the metastable helium atoms to the second triplet P state ($2^3P$). Photo-detectors presently available have relatively low spectral response at this wavelength resulting in an intolerably high noise-to-signal ratio. A locked-oscillation (or swept) system such as disclosed in FIG. 4 of U. S. Pat. No. 3,256,500 issued June 14, 1966 to James T. Arnold is therefore required instead of a more simple self-oscillation system such as illustrated in FIG. 5 of the same patent. This is because, when operating on the 10,830 Amgstrom emission line, the output of the photo-detector is insufficient to support self-oscillation.

SUMMARY OF THE INVENTION

Accordingly, it is a general purpose of the present invention to provide a metastable helium magnetometer operating on a light emission line of a wavelength which produces a photo-detector output signal of sufficient magnitude to sustain self-oscillation and thereby result in a magnetometer of reduced size and weight and demanding less power to greatly simplified circuits while providing increased serviceability, reliability and sensitivity at a substantial reduction in cost.

This is accomplished according to the invention by optically pumping the metastable helium absorption cell with the light emission line of 3888.65 Angstroms wavelength and directly coupling the photo-detector output to the RF resonance coils at the absorption cell.

BRIEF DESCRIPTION OF THE PREFERRED EMBODIMENT

Figure 1:
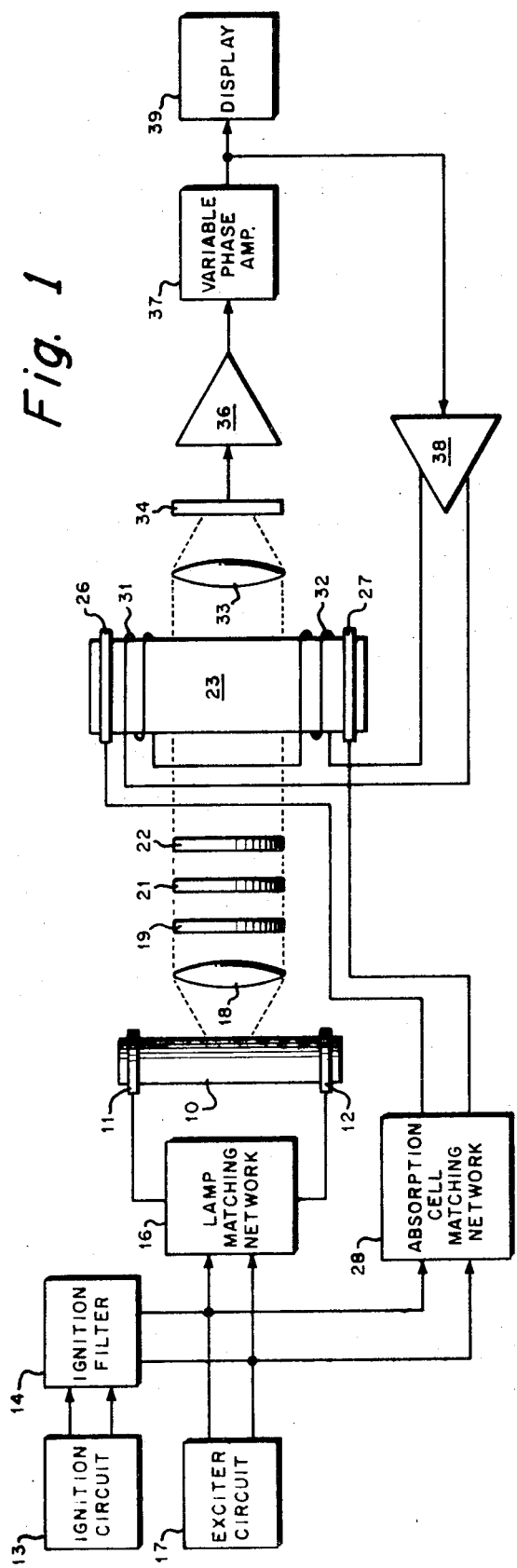
FIG. 1 is a schematic diagram of a self-oscillating metastable helium magnetometer constructed according to the present invention.

Referring now to FIG. 1, there is illustrated a metastable helium magnetometer of the self-oscillation type constructed in accordance with the present invention. Helium gas contained in a lamp 10 is ionized by an electric field generated between electrodes 11 and 12 producing thereby light in the complete helium spectrum including the particular emission line required for optically pumping metastable helium atoms according to the invention. An ignition circuit 13 produces a high voltage a. c. signal which passes through an ignition filter 14 and a lamp matching network 16 to provide a high voltage discharge at electrodes 11 and 12 necessary to initiate ionization of the gas in the lamp 10. An excitor circuit 17 thereafter maintains ionization with a suitable alternating current such as 50 megacycles per second. For helium, approximately 1200 volts is necessary initially to ionize the helium, but only a weak discharge from the excitor circuit 17 is required to maintain ionization. The lamp matching network 16 provides impedance matches at the input to the lamp 10 for obtaining maximum power transfer.

The light generated between electrodes 11 and 12 is collimated by lens 18 and passed through interference filter 19 which suppresses light of wavelengths other than 3888.65 Angstroms. The 3888.65 Angstrom light is then linearly and circularly polarized by linear polarizer 21 and circular polarizer 22 respectively and radiated on an absorption cell 23. The cell 23 contains helium gas which is excited to the metastable second triplet ground state $2^3S_1$ by an electric field produced by electrodes 26 and 27. An absorption cell matching network 28 provides the appropriate impedance matching for the electrical energy from either the exciter circuit 17 or the ignition filter 14.

Figure 2:
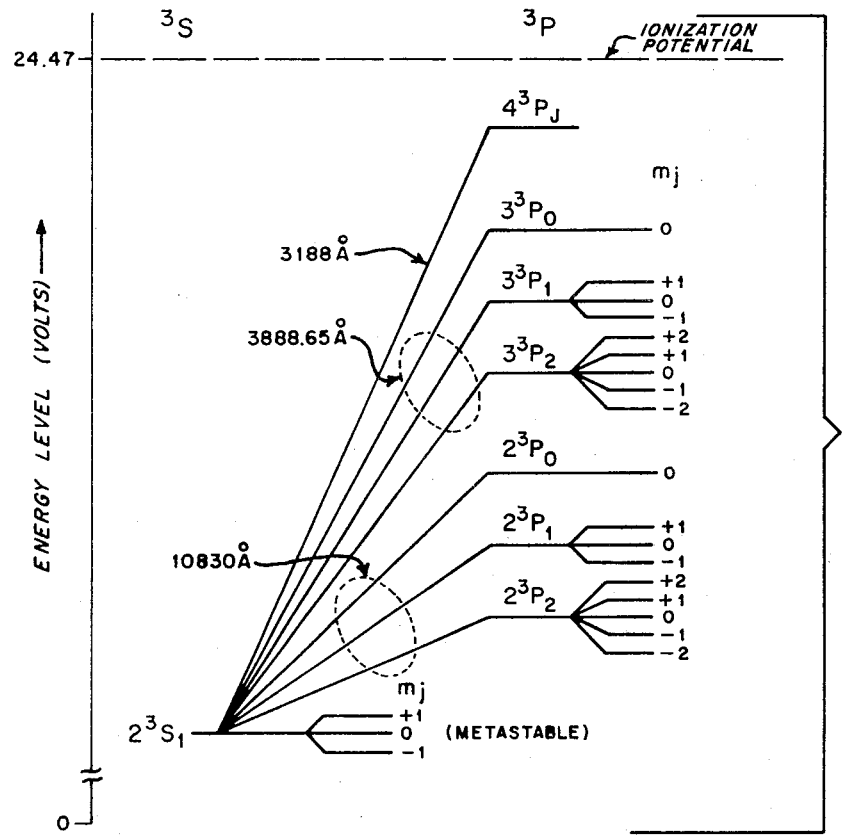
FIG. 2 is a quantum energy level diagram for metastable helium atoms in the triplet S ($3_S$) and triplet P ($3_P$) states.

As shown in FIG. 2, the effect of 3888.65 Angstrom radiation in the absorption cell 23 is to optically pump the meta-stable helium atoms from the $2^3S_1$ state to the $3^3P_J$ state vis-a-vis the $2^3P_J$ state as occurs with 10,830 Angstrom radiation. In either case, the radiation energy applied to the $2^3S_1$ state of the metastable helium causes the atoms to be optically pumped to the $2^3P_J$ or $3^3P_J$ nonmetastable state as the case may be. These atoms return to the $2^3S_1$ state in approximately $10^{-7}$ to $10^{-8}$ seconds which is the lifetime of the $2^3P_J$ or $3^3P_J$ states as compared to a lifetime of $10^{-3}$ seconds for the $2^3S_1$ metastable state. In the presence of a magnetic field, the $2^3S_1$ state experiences splitting into three sub-states (Zeeman energy levels) in which the energy separation between substates is proportional to the field intensity. The energy level separation of the substates may be expressed as:

$$f = kH$$

where:

$f$ = Larmor frequency in Hertz $H$ = magnetic field strength in gammas, and $k$ = gyromagnetic ratio for Helium of 28.024 Hertz/gammas.

Figure 3:
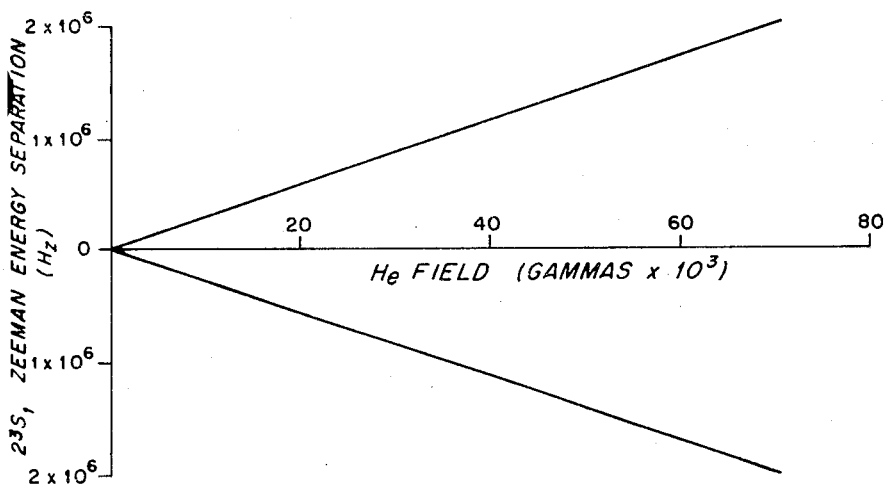
FIG. 3 is a graph of the second triplet ground state ($2^3S_1$) Zeeman energy separation (resonance frequency) of metastable helium atoms versus magnetic field strengths.

It is illustrated in FIG. 3, for example, that the Larmor frequency of $M_J$ substate +1 will vary linearly from 0.7 × $10^6$ to 2.1 × $10^6$ Hertz with an ambient magnetic field change from 25,000 to 75,000 gammas. The modulation frequency of the 3888.65 Angstrom light transmitted through the cell 23 will correspond to the Larmor frequency because some of the light has been absorbed in optically pumping the $2^3S_1$ state atoms to the $3^3P_J$ state. The linear polarization tends to overpopulate substates $M_J = +1$ and $M_J = -1$ at the expense of substate $M_J = 0$ during the transition back to the $2^3S_1$.

The circular polarization, depending on whether it is right- or left-hand, tends to overpopulate either the $M_j = +1$ or $M_j = -1$ substate at the expense of the other substates. This overpopulation increases the amplitude of the modulating light transmitted through the cell 23.

Figure 4:
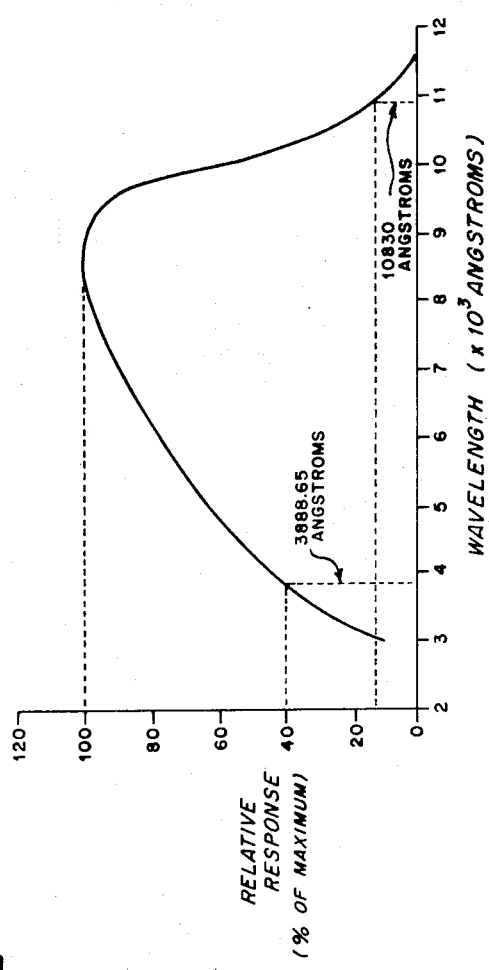
FIG. 4 is a graph of the relative spectral response of a presently available Boron-doped N on P silicon photo-detector as applied to the magnetometer of FIG. 1.

The modulating light transmitted from the lamp 10 is focused by focusing lens 33 onto a photo-detector whose output signal is modulated at the same frequency as the transmitted light, and therefore corresponds to the Larmor frequency at the ambient magnetic field intensity. FIG. 4 shows the relative spectral response of the active material of the photo-detector 34. It comprises a Boron-doped N on P silicon, such as manufactured by Texas Instruments, Inc. as part number 531133-1. Of the emission lines suitable for optically pumping metastable Helium, the three lines at approximately 3888.65 Angstroms produce the highest spectral response, all other emission lines producing relatively low responses. For example, the relative spectral response of the photo-detector 34 at the 3888.65 Angstrom emission line is 42 percent as compared to 13 percent for the next most responsive emission line of 10,830 Angstroms. The present invention therefore utilizes these three lines which, as shown in FIG. 2 and noted above, optically pump the metastable helium atoms to the $3^3P_j$ state and produces an output signal of high signal-to-noise ratio.

The photo-detector signal is amplified by preamplifier 36, fed to a variable phase amplifier 37, and finally to a pair of Helmholtz coils 31 and 32 positioned to provide a uniform magnetic field in the cell 23 transverse to the direction of the light beam. The phase is adjusted in amplifier 37 so that, after the signal passes through the amplifier 38, the phase of the signal applied to the resonance frequency coils 31 and 32 will accelerate equalization in population of the atoms in all $2^3S_1$ substates thereby sustaining self-oscillation in the loop containing components 31 through 38.

A display 39 connected to the output of variable phase amplifier 37 senses the resonance frequency and presents it in a form indicative of the magnetic field intensity.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A self-oscillating metastable helium magnetometer comprising:
    light means emitting light of 3888.65 Angstrom wavelength for optically pumping metastable helium atoms to the $3^3P_j$ state;
    quantum means receiving the light and absorbing the light at a rate proportional to the ambient magnetic field intensity;
    measuring means optimally responsive to light at the emitted wavelength transmitted through said quantum means for producing an output signal indicative of the ambient magnetic field intensity; and
    resonance means operatively connected to said quantum means and said measuring means for maintaining self-oscillation.

2. A magnetometer according to claim 1 wherein said light means includes:
    first circuit means for providing initial and sustaining output signals of a predetermined voltage and frequency;
    emission means receiving the first circuit means output signal and emitting light in the helium spectrum; and
    optical means receiving the light and producing a linearly and circularly polarized collimated light beam of 3888.65 Angstroms wavelength.

3. A magnetometer according to claim 2 wherein said optical means includes:
    a collimating lens receiving the emitted light and producing a collimated light beam;
    a light filter interposed in said light beam transmitting therethrough light of only 3888.65 Angstroms wavelength; and
    polarizer means interposed in the filtered light beam for linearly and circularly polarizing the light.

4. A magnetometer according to claim 3 wherein said first circuit means includes:
    an ignition circuit having a momentary high voltage output signal;
    an ignition filter receiving the ignition circuit output signal and producing an initial high voltage output signal and producing a high voltage output signal of a predetermined frequency bandwidth for initiating light emission;
    an exciter circuit providing a signal of frequency and voltage sufficient to sustain light emission after cessation of said ignition filter output signal; and
    a lamp matching network receiving the ignition filter and exciter circuit output signals and producing an impedance-matched output signal to said emission means.

5. A magnetometer according to claim 4 wherein said quantum means includes:
    a helium absorption cell interposed in the filtered and polarized light beam; and
    an absorption cell matching network receiving said filter and exciter circuit output signals and producing an impedance-matched output signal to said absorption cell or ionizing the helium therein.

6. A magnetometer according to claim 5 wherein said measuring means includes:
    a focusing lens receiving the light transmitted through said absorption cell and focusing the light;
    a photo-detector optimally responsive to light emission of 3888.65 Angstroms receiving the focused light and producing an electrical output signal proportional to the intensity of the light transmitted through said absorption cell; and
    display means receiving an output signal from said second circuit means and producing an indication of the ambient magnetic field intensity.

7. A magnetometer according to claim 6 wherein said resonance means includes:
    second circuit means receiving the photo-detector output signal and producing an amplified and phase adjusted output signal; and
    a pair of Helmholtz resonance coils positioned about said absorption cell receiving the second circuit means output signal and producing a resonance field in said absorption cell transverse to the light beam.

* * * * *